(12) United States Patent
Douceur et al.

(10) Patent No.: US 8,812,908 B2
(45) Date of Patent: Aug. 19, 2014

(54) FAST, NON-WRITE-CYCLE-LIMITED PERSISTENT MEMORY FOR SECURE CONTAINERS

(75) Inventors: John R. Douceur, Bellevue, WA (US); Jacob R. Lorch, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 635 days.

(21) Appl. No.: 12/887,938

(22) Filed: Sep. 22, 2010

(65) Prior Publication Data

US 2012/0072771 A1    Mar. 22, 2012

(51) Int. Cl.
*G06F 11/00* (2006.01)

(52) U.S. Cl.
USPC ............. 714/22; 714/14; 714/24; 714/25; 714/48; 714/47.3; 714/47.2; 711/114

(58) Field of Classification Search
USPC ............. 714/14, 22, 24, 25, 48, 47.2, 47.3; 365/230.03; 711/114
See application file for complete search history.

(56) References Cited

U.S. PATENT DOCUMENTS

| | | | |
|---|---|---|---|
| 5,548,711 A * | 8/1996 | Brant et al. | 714/5.11 |
| 6,295,577 B1 | 9/2001 | Anderson et al. | |
| 6,591,329 B1 | 7/2003 | Kakinuma et al. | |
| 6,725,342 B1 * | 4/2004 | Coulson | 711/141 |
| 6,725,397 B1 * | 4/2004 | Emberty et al. | 714/24 |
| 6,941,423 B2 | 9/2005 | Coulson | |
| 7,000,083 B2 | 2/2006 | Jarvis et al. | |
| 7,380,158 B2 | 5/2008 | Totolos, Jr. | |
| 7,577,690 B2 | 8/2009 | Chandrasekaran et al. | |
| 2002/0048369 A1 * | 4/2002 | Ginter et al. | 380/277 |
| 2003/0163431 A1 * | 8/2003 | Ginter et al. | 705/64 |
| 2003/0191719 A1 * | 10/2003 | Ginter et al. | 705/54 |
| 2004/0083405 A1 * | 4/2004 | Chang et al. | 714/24 |
| 2005/0024974 A1 * | 2/2005 | Noguchi et al. | 365/230.03 |
| 2005/0036390 A1 | 2/2005 | Nakada et al. | |
| 2006/0080515 A1 | 4/2006 | Spiers et al. | |
| 2007/0055909 A1 * | 3/2007 | Smith et al. | 714/22 |
| 2010/0180065 A1 | 7/2010 | Cherian et al. | |

OTHER PUBLICATIONS

Compaq, "Plug and Play BIOS Specification Version 1.0A", Jun. 5, 1994, Compaq, p. 1-56.*
Phoenix, "Phoenix BIOS 4.0 Release 6.0 POST Tasks and Beep Codes", 1997, Phoenix, p. 1-4.*
Compaq, "BIOS Boot Specification Version 1.01", Jan. 11, 1996, Compaq, p. 1-46.*
Award, "Award BIOS Error Codes" Jul. 26, 1999, Award, p. 1-6.*
Enck, et al., "Defending Against Attacks on Main Memory Persistence", retrieved on Jul. 19, 2010 at <<http://www.patrickmcdaniel.org/pubs/acsac08b.pdf>>, IEEE Computer Society, Proceedings of Annual Computer Security Applications Conference (ACSAC), Dec. 2008, pp. 65-74.

* cited by examiner

*Primary Examiner* — Joshua P Lottich
*Assistant Examiner* — Jeison C Arcos
(74) *Attorney, Agent, or Firm* — Dan Choi; Carole Boelitz; Micky Minhas

(57) ABSTRACT

Techniques for providing fast, non-write-cycle-limited persistent memory within secure containers, while maintaining the security of the secure containers, are described herein. The secure containers may reside within respective computing devices (e.g., desktop computers, laptop computers, etc.) and may include both volatile storage (e.g., Random Access Memory (RAM), etc.) and non-volatile storage (NVRAM, etc.). In addition, the secure containers may couple to auxiliary power supplies that are located externally thereto and that power the secure containers at least temporarily in the event of a power failure. These auxiliary power supplies may be implemented as short-term power sources, such as capacitors, batteries, or any other suitable power supplies.

21 Claims, 5 Drawing Sheets

FAST, NON-WRITE-CYCLE-LIMITED PERSISTENT MEMORY FOR SECURE CONTAINERS

BACKGROUND

Secure hardware devices, or "secure containers," often utilize a persistent memory for storing state across power outages or failures. The Trusted Platform Module is one such secure container that utilizes a persistent memory. However, standard implementations of persistent memory, such as flash memory and non-volatile random access memory (NVRAM) have at least two disadvantages. First, these memory types are slow in terms of both latency and throughput. In addition, these memory types are write-cycle limited, meaning that they have a limit on the count of write cycles that they can perform.

The slowness and write-cycle limitations of persistent memory have led to the creation of techniques for building fast, non-write-cycle limited persistent memory. One approach for constructing such a memory uses RAM as a cache for NVRAM-backed storage. During normal operation, components of a computing device are able to read and write to the RAM, which is fast and has no write-cycle limitations. When power is lost, the contents of RAM are flushed to the NVRAM. To provide short-term power for the flushing procedure, these techniques may employ a capacitor to write the contents from RAM to the NVRAM. The capacitor is charged when power is applied to the system, and is discharged by the circuitry that writes the RAM contents to NVRAM.

However, in a straightforward application to a system in which the memory should remain secure, the capacitor must be contained within the secure componentry. If the capacitor resides elsewhere, an attacker can subvert the system by disengaging the capacitor at a critical moment. However, if the size of the memory is substantial, the required capacitor may be too large to affordably house the capacitor within the secure componentry.

SUMMARY

Techniques for providing fast, non-write-cycle-limited persistent memory within secure containers—while maintaining the security of the secure containers—are described herein. In some implementations, the techniques provide a secure container within a computing device, with the secure container including volatile storage, non-volatile storage, and a sensor that is able to detect a power failure at the computing device. The secure container may also include a controller that is able to receive an indication when the sensor has detected the power failure. In response, the controller copies contents of the volatile storage to the non-volatile storage and, after copying, updates a value of a flag within the non-volatile storage to indicate that the state of the non-volatile storage is accurate. With use of this flag, the controller may receive power to perform these tasks from a power supply that resides outside of the secure container. In addition, updating the flag protects the secure container from unknowingly restarting from a power failure with the non-volatile storage having an inaccurate state.

This summary is provided to introduce concepts relating to user interfaces. These techniques are further described below in the detailed description. This summary is not intended to identify essential features of the claimed subject matter, nor is it intended for use in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
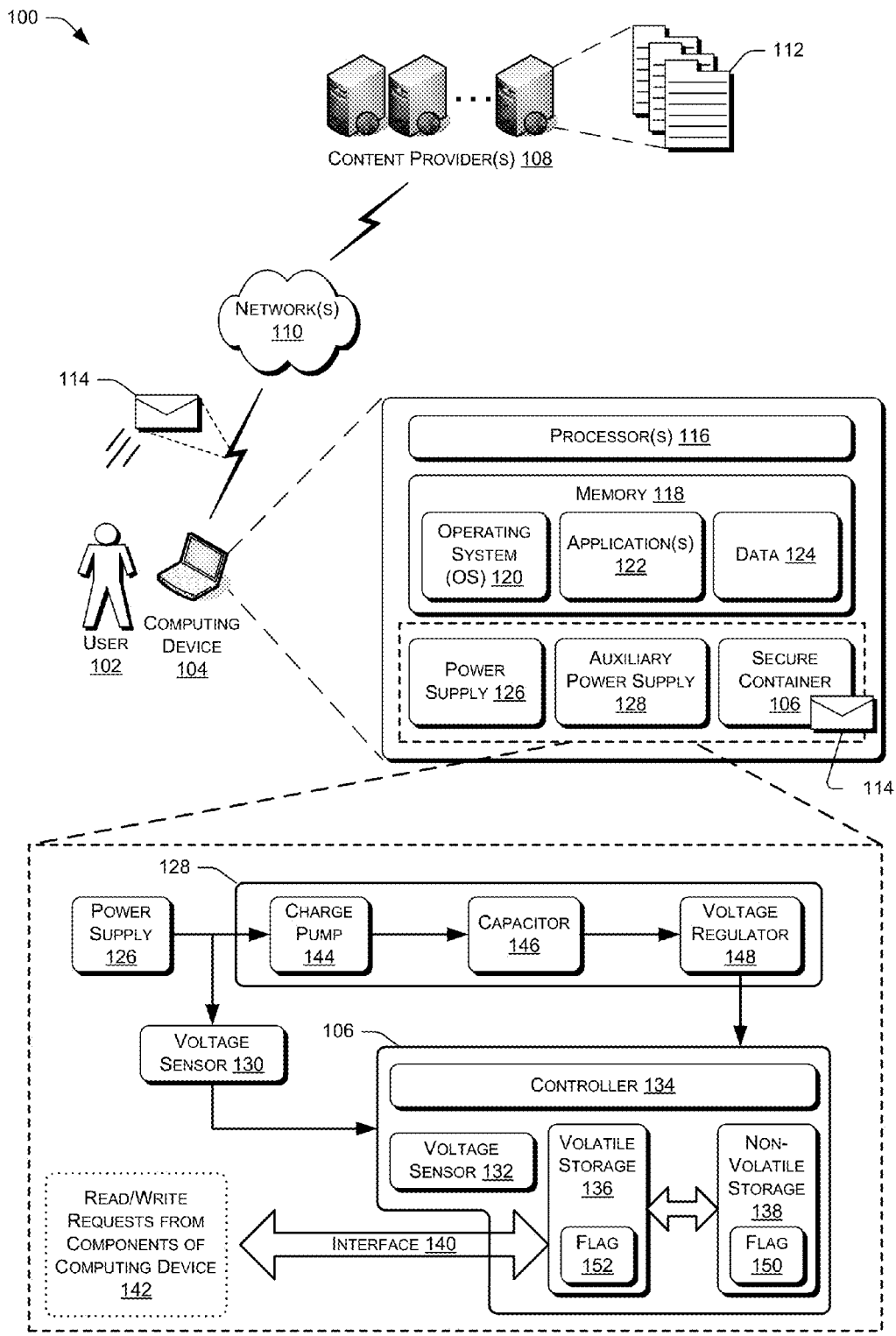
FIG. 1 illustrates an example computing architecture including a computing device having a secure container that implements fast, non-write-cycle-limited persistent memory. The secure container also includes a controller to maintain the security of the container in the event of a power failure, the controller being powered by an auxiliary power supply that resides outside of the secure container after the power failure.

The disclosure describes techniques for providing fast, non-write-cycle-limited persistent memory within secure containers, while maintaining the security of the containers. The secure containers described below may reside within respective computing devices (e.g., desktop computers, laptop computers, etc.) and may include both volatile storage (e.g., Random Access Memory (RAM), Dynamic RAM (DRAM), Static RAM (SRAM), etc.) and non-volatile storage (NVRAM, flash memory, magnetoresistive RAM (MRAM), etc.). In addition, the secure containers may couple to an auxiliary power supply that is located outside of the secure container and that powers the secure container at least temporarily in the event of a power failure. This auxiliary power supply may comprise a short-term power source, such as a capacitor, a battery, or any other suitable power supply.

The volatile storage, meanwhile, contains a cache of the contents of the non-volatile storage, and the non-volatile storage also indicates whether the volatile storage and non-volatile storage may be out-of-sync. For instance, the non-volatile storage may include an indicator, such as a flag or any other form of indicator, that indicates whether the volatile storage and non-volatile storage: (i) are certainly in-sync, or (ii) may be out-of-sync. The techniques described below update this indicator in a manner designed to ensure that if an attacker disengages the auxiliary power supply, either the non-volatile storage is consistent with the last value written to volatile storage or the device becomes unusable. By doing so, the techniques ensure that the worst damage that an attacker can do to the secure container is render the secure container inoperable. At no point in time may the attacker trick the secure container to believe that its state is accurate, when in truth the state is not. As such, the techniques described below maintain the security of the secure containers.

Stated otherwise, because the auxiliary power supply is located outside of the secure container, an attacker can disconnect, disrupt, or manipulate this power supply at any time—and thus prevent the controller from writing the contents of volatile storage to the non-volatile storage. However, the techniques described herein and the processes illustrated below ensure that if the system is prevented from copying the contents of volatile storage to the non-volatile storage in this manner, the system will no longer function. This makes the attack no different than physically destroying the system. Because physical access is required to disconnect or disable the power supply, an attacker could just as easily use this physical access to physically destroy the system, so a non-functional system is no worse than the attacker could achieve via other, more direct means. While the attacker may still destroy the system, the techniques prevent the attacker from reverting the state of the system to an earlier, incorrect state.

The discussion begins with a section entitled "Example Computing Architecture," which describes one non-limiting environment that may implement the described techniques. Next, a section entitled "Example Power-Up Procedures" illustrates several example processes for ensuring that a secure container has an accurate state upon power-up of a computing device that includes the secure container. A section entitled "Example Power-Down Procedures" follows, and illustrates and describes example processes for updating the state of a non-volatile storage of the secure container upon detecting a power failure, whether intentional or otherwise. A brief conclusion ends the discussion.

This brief introduction, including section titles and corresponding summaries, is provided for the reader's convenience and is not intended to limit the scope of the claims, nor the proceeding sections.

Example Computing Architecture

FIG. 1 illustrates an example computer architecture 100 that may implement a secure container as described above. The architecture 100 includes a user 102 operating a computing device 104. While FIG. 1 illustrates the computing device 104 as a laptop computer, other implementations may employ a desktop computer, a thin client, a mobile telephone, a portable music player or any other sort of suitable computing device.

As illustrated, the computing device 104 includes a secure container 106, which may comprise a secure cryptoprocessor (e.g., a Trusted Platform Module, a Hardware Security Module) or any other container that includes tamper-resistant hardware that is isolated from other components of the computing device 104. While FIG. 1 illustrates that the secure container 106 resides within the computing device 104, in other implementations the secure container 106 of the device 104 may reside elsewhere but may couple to the device 104 directly, over a network, or in any other manner.

The secure container 106 may perform a variety of cryptographic operations in isolation from other components of the computing device 104. In one of many examples, the secure container 106 may "attest" to a state of the computing device 104 to other entities. In FIG. 1, for instance, the user operates the device 104 to communicate with a remote verifier 108 over a network 110. The network 110 is representative of any one or combination of multiple different types of networks, such as the Internet, cable networks, cellular networks, wireless networks, and wired networks. As illustrated, the remote verifier 108 stores or has access to one or more files 112. In this example, the files comprise songs, movies, or other files that are subject to Digital Rights Management (DRM) policies. Of course, the described techniques may apply to any other sort of remote verification, and FIG. 1 merely illustrates one of a vast array of varying examples. Other examples may include a customer of a cloud computation provider ensuring that the cloud follows the customer's instructions, a game player ensuing that another game player isn't cheating, a drive encryption feature (e.g., BitLocker® by Microsoft Corporation) ensuring that someone who steals a laptop is unable to guess the disk decryption PIN an unlimited number of times, and the like. Again, these examples represent but a few of many.

In this particular example, the user 102 may operate the device 104 to purchase, from the remote verifier 108 or another provider, a license to consume one of the files 112 a limited number of times. For instance, envision that the file 112 is a movie and the user 102 purchases a license to watch the movie three times. As such, when the user 102 uses the computing device 104 to watch the movie, the remote verifier 108 may seek assurance that the user 102 has not watched the movie more than the limited number of times (here, three times). As such, the remote verifier 108 may request that the secure container 106 attest to the number of times that the computing device 104 has consumed the movie (or to attest to a remaining number of watches).

Therefore, when the user attempts to play the movie (e.g., using a media player operating on the computing device 104), the secure container may generate an attestation 114 that states the number of remaining times that the user may watch the movie. The device 104 then sends the attestation 114 to the remote verifier 108, which trusts the statement made by the secure container 106 and, in response, allows the device 104 to watch the purchased movie. Furthermore, the secure container 106 may update the remaining number of times that the user 102 may watch the movie by, for example, decrementing the count from three to two. The secure container 106 may additionally or alternatively perform any other array of functions, at least a portion of which the container 106 performs in isolation from other components of the device 104.

As illustrated, the computing device 104 also includes one or more processors 116 and memory 118, which may store an operating system 120, one or more applications 122, and data 124. For instance, one of the applications 122 may comprise a media player for playing the purchased movie described above, while the data 124 may include the local copy of the movie.

In addition, the device 104 includes a power supply 126 that powers the computing device. This power supply may comprise a battery (that may or may not plug into an alternating current power supply) or any other power supply capable of powering the device 104. In addition, the computing device 104 may include an auxiliary power supply 128 to power the secure container 106 in the event of a power failure, such as the user shutting down the device 104 or the power supply 126 failing. The auxiliary power supply 128 may comprise a short-term power supply, such as a capacitor, a battery, or any other type of power supply. In some instances, the auxiliary power supply 128 resides outside of the secure container 106. The device 104 may also include a voltage sensor 130 that functions to monitor the incoming power from the power supply 126 to determine whether or not this incoming power is greater than a threshold value. In some instances, the threshold value is based at least in part on a level of power needed to adequately power the secure container 106, as discussed in detail below.

FIG. 1 also shows, in further detail, one example circuit between the power supply 126, the auxiliary power supply 128, and the secure container 106. As illustrated, the power supply 126 may provide power to the auxiliary power supply 128 and the secure container 106. The secure container 106 includes, at least in part, a voltage sensor 132, a controller 134, volatile storage 136 (e.g., RAM), non-volatile storage 138 (e.g., NVRAM, flash memory, etc.) and a secure interface 140 (i.e., secure read/write port). The controller 134 may be a processor, a microcontroller, a finite state machine, or any other device capable of performing the operations described herein. Other components of the computing device 104, meanwhile, may communicate with the secure container by making read and write requests 142 via the interface 140. During normal operation, the components perform the read and write requests 142 to and from the volatile storage 136, which is fast and has no write-cycle limitations. In some instances, the secure container 106 is inaccessible to and isolated from the other components of the device 104 other than via the interface 140.

As illustrated, the auxiliary power supply 128 resides external to the secure container 106. In this example, the auxiliary power supply 128 is shown as a series of three components: a charge pump 144, a capacitor 146, and a voltage regulator 148. The charge pump 144 increases the voltage level of the incoming power from the power supply 126 to a higher level than that used to operate the volatile storage 136, the non-volatile storage 138, and the controller 134 (e.g., 3.3 volts). The capacitor 146 stores energy by charging up to this elevated voltage level (e.g., 12 volts). The voltage regulator 148 regulates the voltage coming out of the capacitor 146 down to the level used to operate by the volatile storage 136, the non-volatile storage 138, and the controller 134, such as the example 3.3 volts. While the above example describes driving up the voltage from 3.3 volts to 12 volts, other embodiments and architectures may employ other operational voltage levels, and/or may drive up the incoming voltage to any other level.

As a result of this circuit, the volatile storage 136, the non-volatile storage 138, and the controller 134 receive power at their operational voltage (e.g., 3.3 v), not only during the time that power is applied externally, but also for a short duration following a power failure. To illustrate, the voltage sensor 130 that resides outside of the secure container 106 functions to monitor the incoming power from the power supply 126 to determine whether or not this incoming power is greater than a threshold value. In some instances, the threshold value is based at least in part on a level of power needed to adequately power the controller 134, volatile storage 136, and the non-volatile storage 138. For instance, the threshold value may comprise the normal power provided by the power supply 126 (e.g., 3.3 volts), some percentage of this number (e.g., 95% of 3.3 volts, at which the secure container 106 remains operational), or some other value at which the secure container 106 remains operational. While the voltage sensor 130 may measure an incoming voltage in some instances, in other instances the illustrated circuit may include any other sensor that may detect the power failure by measuring any other value, such as current, resistance, and the like. Further, the voltage sensor 130 may reside within the secure container 106 in some instances, and/or may comprise the same sensor as the voltage sensor 132 discussed in detail below. Further, it is to be appreciated that the operations performed by the different voltage sensors described below may be performed by different combinations of the voltage sensors 130 and 132, or by other sensor(s).

In the current example, when the voltage sensor 130 detects that the power from the power supply 126 is less than this threshold value, the voltage sensor 130 determines that the computing device 104 is experiencing a power failure. In response, the voltage sensor 130 provides an indication of the power failure to the controller 134 within the secure container 106. In addition, the (charged) capacitor 146 provides its stored power to the secure container 106 until the capacitor 146 drains of energy.

The volatile storage 136, the non-volatile storage 138, and the controller 134 therefore receive operational power between the time of the power failure and a later time when the voltage of the capacitor 146 falls below the operation level of the volatile storage 136, the non-volatile storage 138, and the controller 134. As such, the volatile storage 136, the non-volatile storage 138, and the controller 134 are able to operate for at least a short time interval following a power failure. During this time interval, the controller 134 may copy contents of the volatile storage over to the non-volatile storage, as discussed in detail below.

In addition, the secure container 106 may also include the voltage sensor 132 to monitor the amount of power coming into the secure container 106. When the voltage sensor 132 detects that the amount of power coming into the secure container 106 is less than a threshold value (e.g., an amount of a power needed to properly operate the secure container 106), the voltage sensor 132 instructs the controller 134 to cease operations and the secure container 106 becomes at least temporarily unusable, as discussed in detail below. Note that because the voltage sensor 132 resides within the secure container 106, the voltage sensor 132 is not subject to attack. That is, an attacker is unable to trick the voltage sensor 132 into altering its threshold value, with reference to which the sensor 132 detects a power failure of the device 104. As such, placing the voltage sensor 132 within the secure container 106 prevents the secure container 106 from being subject to potential brownout attacks initiated by attackers that alter the operation of the voltage sensor 132. In particular, there may be a voltage level that is not high enough for the components in the secure container to operate properly yet is not low enough to cause these components to completely cease operation. To prevent an attacker from exploiting the incorrect behavior that would occur at this voltage level, voltage sensor 132 is used to sense such a potentially harmful condition, thereby triggering the cessation of operation.

FIG. 1 further illustrates that the non-volatile storage 138 may include a correctness flag 150, which represents a designated location within the non-volatile storage 138. The controller 134 may use the correctness flag 150 to record and indicate whether (i) the contents of the non-volatile storage 138 are definitely consistent with the contents of volatile storage 136, or (ii) the contents of the non-volatile storage 138 may not be consistent with the contents of volatile storage 136. That is, the correctness flag 150 may indicate whether the state of the non-volatile storage 138 is accurate or correct, or possibly inaccurate or not correct. During manufacturing, or when the secure container 106 is reset, the correctness flag 150 may be set to have a value of "OK." In addition, the non-volatile storage 138 is then set to match the state that the volatile storage 136 will have just after the computing device 104 and the secure container 106 power-up. The value "OK" indicates that the state of the non-volatile storage 138 is correct, while a value of "Not-OK" indicates that the state of the non-volatile storage 138 may not be correct.

In addition, the volatile storage 136 may include an operational flag 152 that indicates whether or not writes to the volatile storage 136 are enabled. For instance, the operational flag 152 within the volatile storage 136 may initially be set to "not enabled," and the controller 134 may change the value to "enabled" upon executing a successful power-up procedure, as discussed in detail below. Furthermore, when the voltage sensor 130 detects a power failure, the controller 134 may change the value of the flag back to "not enabled," thereby disallowing the read and write requests 142 to the volatile storage 136 while the controller executes the power-down procedure, also described in more detail below. The operational flag 152 within the volatile storage 136 ensures that attackers cannot alter contents of the secure container 106—without the knowledge of secure container 106—in instances where the controller 134 is subject to multiple threads of control.

Example Power-Up Procedures

FIGS. 2-5 comprise illustrative flow diagrams of example processes that may be implemented within the architecture 100 of FIG. 1. Each of these processes is illustrated as a collection of acts in a logical flow graph, which represents a sequence of operations that can be implemented in hardware, software, or a combination thereof. In the context of software, the blocks represent computer instructions stored on one or more computer-readable storage media that, when executed by one or more processors, perform the recited operations. Note that the order in which the process is described is not intended to be construed as a limitation, and any number of the described acts can be combined in any order to implement the process, or an alternate process. Additionally, individual blocks may be deleted from the process without departing from the spirit and scope of the subject matter described herein.

Figure 2:
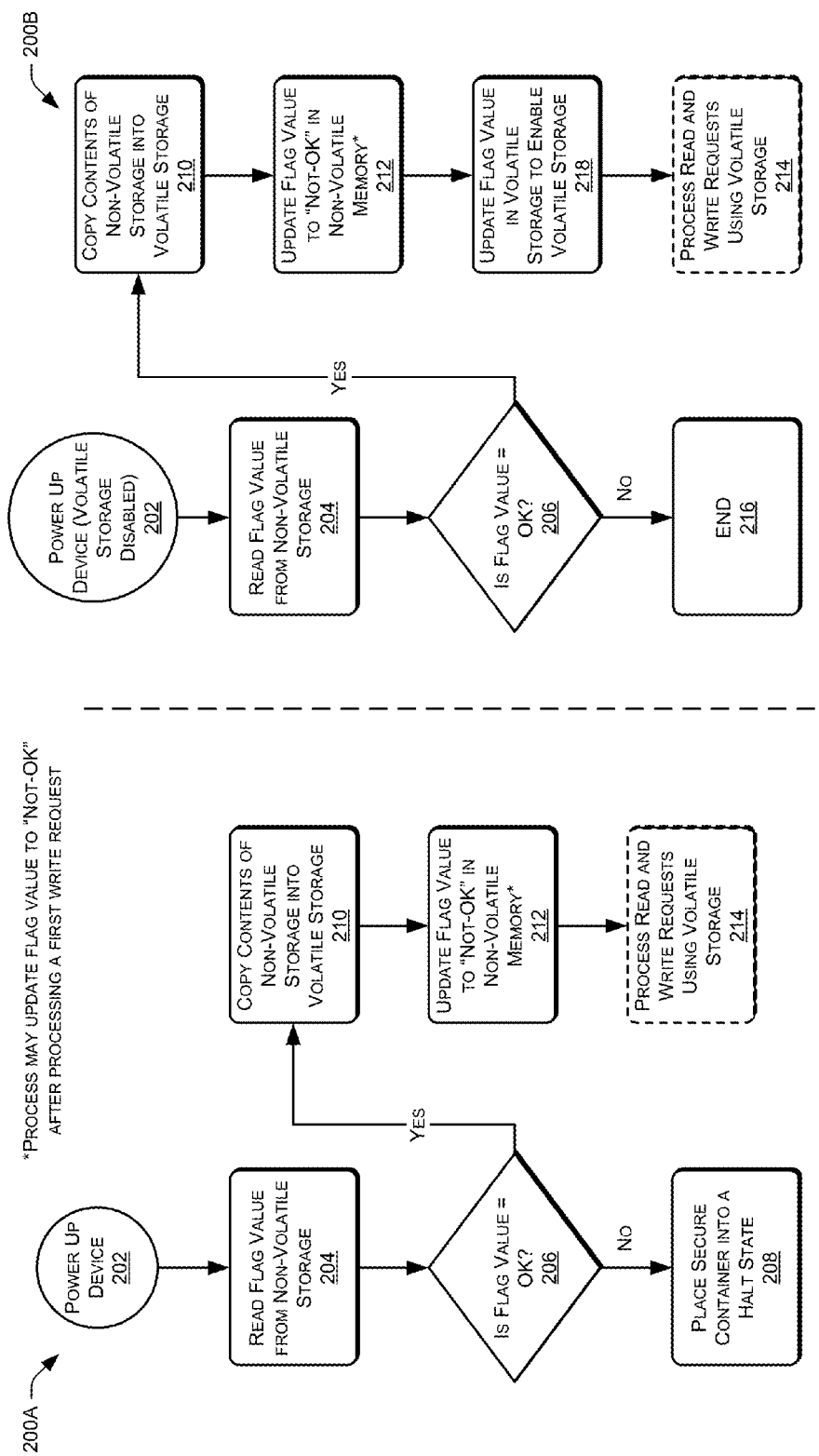
FIG. 2 illustrates example processes for determining the integrity of the non-volatile state of the secure container of FIG. 1 upon power-up of the computing device.

FIG. 2 illustrates example processes 200A and 200B for determining the integrity of the non-volatile state of the secure container 106 of FIG. 1 upon power-up of the computing device 104. In some instances, the controller 134 may implement some or each of the operations of the processes 200A and 200B. The controller 134 may execute the process 200A when the controller operates under a single thread of control and, hence, performs the operations of the process 200A atomically or sequentially. In these instances, the volatile storage 136 of the architecture 100 of FIG. 1 may exclude the operational flag 152.

The controller 134 may execute the process 200B, meanwhile, in instances when the controller 134 operates or is configured to operate under multiple threads of control. As the description below illustrates, the process 200B disables a potential attacker from performing illicit actions on the secure container 106 prior to the completion of the power-up process by the controller 134.

Turning first to the power-up process 200A, operation 202 represents that the computing device 104 has been powered on. For instance, the voltage sensor 132 may receive the incoming power that powers secure container 106 and may determine that this received voltage is higher than the threshold value. As such, the voltage sensor 132 may indicate to the controller 134 that the computing device 104 has been powered on and that secure device 106 has sufficient power to begin operation. In response, the controller 134 may execute the operations that follow. At operation 204, the controller 134 reads a value of the correctness flag 150 from the non-volatile storage 138 upon power of the device 104. At operation 206, the controller queries whether the value of the correctness flag 150 indicates that the contents of the non-volatile storage 138 are definitely consistent with the contents of the volatile storage 136 (e.g., "OK"), or whether the contents of the non-volatile storage 138 may not be consistent with the contents of the volatile storage 136 (e.g., "Not-OK"). If the flag is set to Not-OK (the "No" branch of the decision block 206), the controller 134 enters a halt state and refuses to perform any operations at operation 208. The controller 134 does so in response to the correctness flag 150 indicating that the contents of the non-volatile storage 138 may not be consistent with the contents that the volatile storage 136 had prior to its last power-down.

Alternatively, if the flag is set to OK (the "Yes" branch of the decision block 208), the controller 134 knows that the contents of the non-volatile storage 138 are definitely consistent with the contents that the volatile storage 136 had prior to its last power-down. As such, the controller 134 copies the data from the non-volatile storage 138 into the volatile storage 136 at operation 210. In some embodiments, the controller 134 may instead copy only the portions of the contents of the non-volatile storage 138 that are different from the power-up state of the contents of volatile storage 136. For instance, if volatile storage 136 is known to power up in a state in which all memory locations have the value zero, then if only a fraction of the contents of non-volatile storage 138 are non-zero, it is not necessary for the controller 134 to overwrite the zero values in volatile storage 136 with other zero values from non-volatile storage 138.

Next, at operation 212 the controller 134 writes the value Not-OK to the correctness flag 150, indicating that the contents of the non-volatile storage 138 may not be consistent with the contents of the volatile storage 136. The controller 134 does so because the controller 134 is about to permit writes to the volatile storage 136 that will change the state of the volatile storage 136, but not the state of the non-volatile storage 138. As an alternate embodiment and as FIG. 2 indicates, the controller 134 could instead wait and write the value Not-OK to the correctness flag 150 later, when the volatile storage 136 is first written to. A discussion of FIG. 4, below, describes effects of this embodiment in further detail.

At operation 214, the controller 134 enters a state during which the secure container 106 processes read and write requests 142 received from components of the computing device 104 that are external to the secure container. In some instances, these reads and writes occur exclusively on the volatile storage 136, which is fast and which is not write-cycle-limited, as the interface 140 does not allow interaction between the non-volatile storage 138 of the secure container 106 and the other components of the computing device 104. FIG. 2 illustrates the operation 214 in broken lines, indicating that the "processing" operation may occur after the power-up procedure and in the event that components of the computing device 104 in fact make such read or write requests 142 via the interface 140.

The controller 134, meanwhile, may implement the process 200B when the controller 134 is subject to multiple threads of control. In this embodiment, the volatile storage 136 may initially reside in a disabled state upon power-up, meaning that the controller will not allow external read and write requests 142 to the volatile storage 136. In one example, the volatile storage 136 is effectively disabled based on the value of the operational flag 152 within the volatile storage 136 indicating this disabled state (as read by the controller 134).

The process 200B again includes the powering-on of the device 104 at operation 202 and the reading the value of the correctness flag 150 from the non-volatile storage 138 at the operation 204. At operation 206, the controller 134 again queries whether the value of the correctness flag 150 is set to "OK" or "Not-OK." If the correctness flag 150 has a value of Not-OK, the process 200B is ended at operation 216. Note that in this example, the process 200B has proceeded to the "end" of the process without having enabled the volatile storage 136, meaning that the controller 134 does not allow read and write requests to occur to the volatile storage 136. In other words, at the block 216, the secure container is in the same effective state as the halt state describe above with reference to the operation 208.

If, however, the controller 134 determines that the flag is indeed set to "OK," then at operation 210 the controller 134 copies contents of the non-volatile storage 138 into the volatile storage 136. Again, in some embodiments the controller 134 may instead copy only the portions of the contents of the non-volatile storage 138 that are different from the power-up state of the contents of volatile storage 136 over to the volatile storage 136. Next, at the operation 212 also described above, the controller 134 updates the value of the correctness flag 150 to "Not-OK." Again, the controller 134 or another entity may alternately update the flag value to "Not-OK" after processing a first write to the volatile storage 136 at a later time. In either instance, the controller 134 proceeds to update the value of the operational flag 152 within the volatile storage 136 at operation 218. By doing so, the controller 134 may now process read and write requests 142 to the volatile storage 136. The operation 214 in the process 200B represents the processing of the read and write requests 142 received from components of the computing device 104 that are external to the secure container 106.

Example Power-Down Procedures

Figure 3:
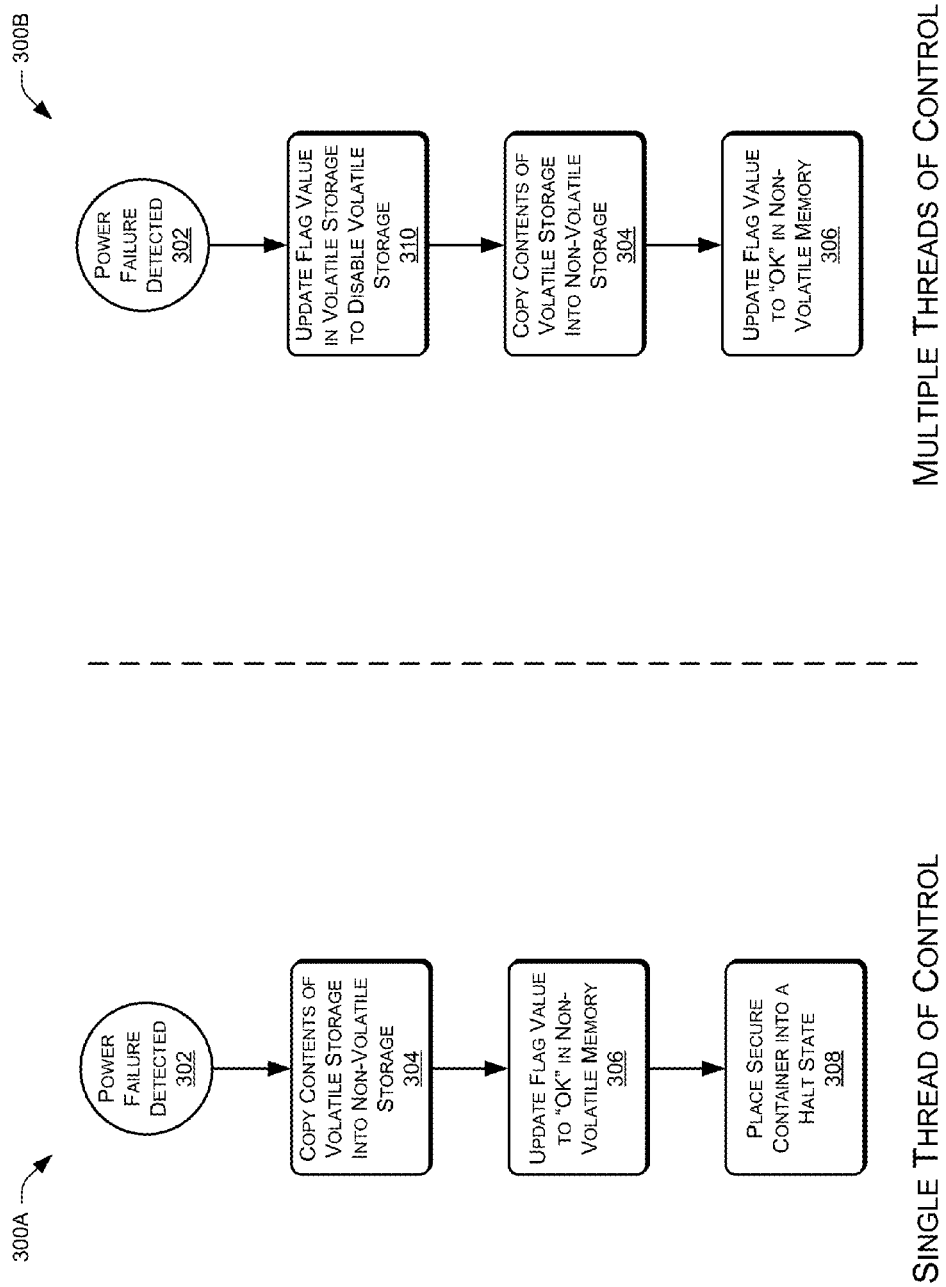
FIG. 3 illustrates example processes for maintaining the integrity of the non-volatile state of the secure container of FIG. 1 upon the computing device experiencing a power failure.

FIG. 3 illustrates example processes 300A and 300B for maintaining the integrity of the non-volatile state of the secure container 106 of FIG. 1 upon the computing device 104 experiencing a power failure. For both processes of FIG. 3, the controller 134 may receive power from the auxiliary power supply 128 (e.g., the charged capacitor 146) for at least a short time interval after the power failure. Further, in some instances the controller 134 only executes the processes of FIG. 3 (and FIGS. 4 and 5) after a power-up procedure has completed and the system did not enter a halt state as a result. If not, an attacker could possibly subvert the system by powering down the device 104 (and the secure container 106) shortly after powering it up.

Again, the process 300A represents a process that the controller 134 may execute in instances where the controller is subject to a single thread of control. First, a block 302 represents that the voltage sensor 130 has detected that the computing device 104 has experienced a power failure. That is, block 302 represents that the sensor 130 has determined that the incoming power from the power supply 126 is less than the threshold value, such as the value needed to operate the controller 134, the volatile storage 136, and the non-volatile storage 138 of the secure container. This power failure may comprise any sort of event in which the power provided by the power supply 126 of the device 104 dips below a threshold value, as measured by the voltage sensor 130. For instance, the user 102 simply executing a normal power down of the device 104 may result in the sensor detecting a power failure.

Figure 4:
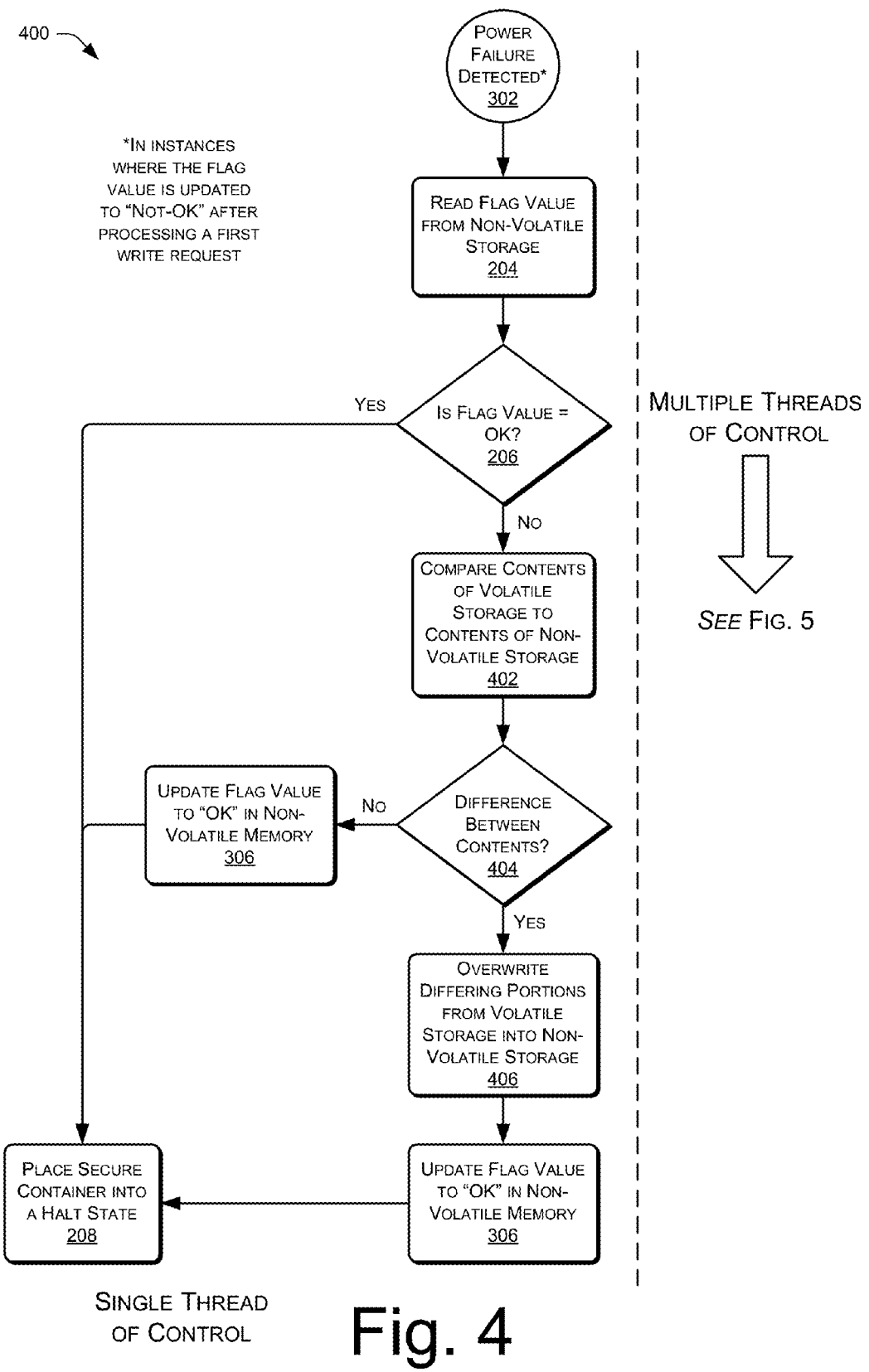
FIGS. 4-5 illustrate example alternative processes for maintaining the integrity of the non-volatile state of the secure container of FIG. 1 upon the computing device experiencing a power failure. Here, the controller within the secure container determines whether a flag within the non-volatile storage has changed prior to copying contents of the volatile storage to the non-volatile storage. In addition, the controller may copy over the portions of the volatile storage that differ from the non-volatile storage, while refraining from copying over the remaining portions.

In response to receiving this indication, the controller 134 may execute the illustrated operations. At operation 304, for instance, the controller 134 may copy contents of the volatile storage 136 into the non-volatile storage 138. In an alternate embodiment where the controller updated the correctness flag 150 to "Not-OK" after a first write after power-up, the controller 134 may instead check the flag to see if any copying may be necessary. In either embodiment, the controller 134 may also compare the contents of the volatile storage 136 and the non-volatile storage 138 and copy the differing portions while refraining from copying matching portions, rather than simply copying the entire contents of the volatile storage. FIG. 4 discusses these variations in greater detail below.

While the controller 104 copies the contents of the volatile storage 136 into the non-volatile storage 138 during the operation 304, the voltage sensor 132 that resides within the secure container 106 may continue to monitor the amount of power provided to the secure container 106 (e.g., from the auxiliary power supply 128). If the voltage sensor 132 detects (at any time prior to the completion of the operation 304) that the amount of power entering the secure container 106 is less than a threshold value, then the controller 104 may cease all operations place the secure container 106 into the halt state. This threshold value may comprise the amount of power needed to ensure proper operation of the secure container 106.

In the example of FIG. 3, the controller 134 may update the value of the correctness flag 150 to "OK" at operation 306. At operation 308, the controller 134 may place the secure container 106 into a halt state. As discussed above, the controller 134 does not allow read or write requests 142 to the secure container 106 when the container 106 resides in the halt state. As such, no reads or writes are allowed to occur on the volatile storage 136 after the copying of the contents of the volatile storage 136 to the non-volatile storage 138 and prior to the power-down of the secure container 106 (e.g., before the capacitor fully drains below the operational level of the secure container 106). In some instances, the controller 134 may place the secure container 106 into the halt state immediately upon detecting the power failure at the block 302.

The controller 134, alternatively, may implement the process 300B in instances where the controller 134 is subject to multiple threads of control. Again, at block 302, the controller receives an indication that the computing device 104 is experiencing a power failure. In response and prior to taking any other action, at operation 310, the controller 134 updates the value of the operational flag 152 in the volatile storage 136 to "disabled", disabling any subsequent reads or writes to the volatile storage 136. Next, at the operation 304, the controller 134 may copy contents of the volatile storage 136 into the non-volatile storage 138. Again, the same variations discussed above with reference to the process 300A also apply here to the process 300B. Further, while the controller 104 copies the contents of the volatile storage 136 into the non-volatile storage 138 during the operation 304, the voltage sensor 132 that resides within the secure container 106 may again continue to monitor the amount of power provided to the secure container 106 (e.g., from the auxiliary power supply 128). If the voltage sensor 132 detects (at any time prior to the completion of the operation 304) that the amount of power entering the secure container 106 is less than a threshold value, then the controller 104 may cease all operations place the secure container 106 into the halt state.

In any event, at the operation 306 the controller 134 may update the value of the correctness flag 150 within the non-volatile storage 138 to "OK."This flag value indicates that the state of the non-volatile storage 138 matches the state of the volatile storage 136, which will be erased when the short-term power supply (e.g., the capacitor 146) discharges below the requisite power level and the device 104 entirely shuts down.

Figure 5:
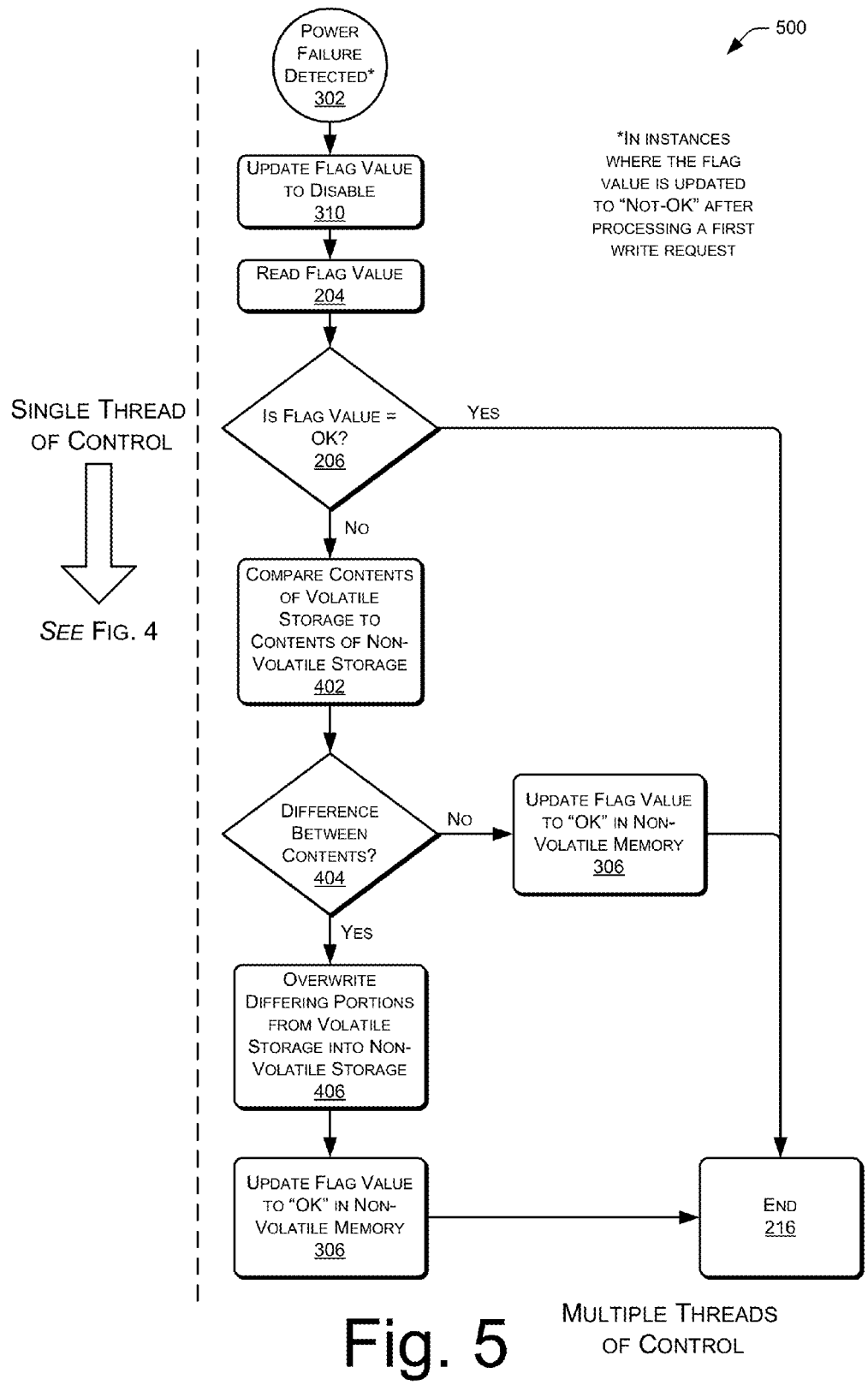

FIGS. 4-5 illustrate example alternative processes 400 and 500 for maintaining the integrity of the non-volatile state of the secure container 106 of FIG. 1 upon the computing device 104 experiencing a power failure. These processes include variations from the processes 300A and 300B describe above that, in some instances, may provide additional efficiencies and benefits to implementing the described techniques. Further, while not illustrated, the voltage sensor 132 that resides within the secure container 106 continues to monitor the amount of power provided to the secure container 106 (e.g., from the auxiliary power supply 128) during the execution of the processes 400 and 500. If the voltage sensor 132 detects that the amount of power entering the secure container 106 is less than a threshold value, then the controller 104 may cease all operations place the secure container 106 into the halt state. This threshold value may comprise the amount of power needed to ensure proper operation of the secure container 106.

FIG. 4 illustrates the process 400, which the controller 134 may execute when subject to a single thread of control. At the operation 302 in FIG. 4, the controller 134 again receives an indication that the computing device 104 is experiencing a power failure. Here, the controller 134 receives this indication in instances where the controller 134 updated (or may have updated) the correctness flag 150 within the non-volatile storage 138 to Not-OK after processing a first write to the volatile storage 136.

In response to receiving the indication, the controller 134 performs the operation 204 described above. That is, the controller 134 reads the value of the correctness flag 150 from the non-volatile storage 138. At the operation 206 of process 400, the controller 134 determines whether the value of the correctness flag 150 is "OK" (i.e., whether the state of the non-volatile storage 138 is correct or matches the state of the volatile storage 136). If so (the "Yes" branch of the decision block 206), the controller 134 places the secure container into the halt state at the operation 208. Note that in this example, the controller 134 did not ever update the flag to Not-OK between power-up of the computing device 104 and power-down of the computing device 104, enabled by the fact that the controller 134 planned to update the correctness flag 150 in response to a write to the volatile storage 136.

Because no writes to the volatile storage 136 occurred in this example, the controller 134 spared the non-volatile storage 138 two writes. That is, the controller 134 did not write "Not-OK" to the correctness flag 150 upon power-up and, conversely, the controller 134 also did not write "OK" to the correctness flag 150 upon the power failure. As such, the process 400 may lengthen the life of the secure container 106, given that the non-volatile storage 138 is write-cycle limited. In addition, this embodiment may result in faster power-up procedures and power-down procedures, as the avoided writes to the non-volatile storage 138 are typically slow—a characteristic typical of non-volatile storage. Of course, these processes transfer a portion of this latency to a first write, which not only results in a write to the fast volatile storage 136, but also a write to the slower non-volatile storage 138 (in the form of updating the correctness flag 150).

Returning to the decision block 206, if the controller 134 determines that the flag is set to Not-OK (the "No" branch of the decision block 206), then the controller 134 may compare contents of the volatile storage 136 to contents of the non-volatile storage 138 at operation 402. At operation 404, the controller 134 determines whether a difference exists between these contents. If not (the "No" branch of the decision block 404), the controller 134 proceeds to update the correctness flag 150 to Not-OK at the operation 306 and, thereafter, places the secure container 106 in the halt state. In this instance, the user 102 may have performed an operation on the device 104 that resulted in a write to the volatile storage 136 (hence, updating the flag to Not-OK) and then performed another operation that resulted in another write to the volatile storage 136 that returned the state of the volatile storage to its state upon power-up. This series of operations again saves time in the power-down process, as the controller 134 need not perform a write to the slower non-volatile storage 138. In addition, these operations save writes to the write-cycle-limited non-volatile storage.

Returning to the decision block 404, if the controller 134 determines that a difference does exist between the contents of the volatile storage 136 and the non-volatile storage 138 (the "Yes" branch of the decision block 404), then the controller 134 determines at operation 406 which portions of the volatile storage 136 differ from corresponding portions of the non-volatile storage 138. The controller may then overwrite these portions of the non-volatile storage 138 from the corresponding portions of the volatile storage 136. Again, this saves time in the power-down process, as well as writes to the non-volatile storage 138. In some instances, as opposed to overwriting portions of the non-volatile storage 138 at the operation 404, the controller 134 may simply copy an entirety of the contents of the volatile storage 136 to the non-volatile storage 138, as described above at the operation 304.

Finally, at the operation 306, the controller 134 updates the value of the correctness flag 150 to "OK" in the non-volatile storage 138. Thereafter, the controller 134 may place the secure container 106 into the halt state.

FIG. 5 illustrates a power-down process 500 that the controller 134 may implement when the controller 134 is subject to multiple threads of control. Again, at the block 302 the controller 134 receives an indication that the voltage sensor 130 has detected a power-failure. In response, at the operation 310, the controller 134 updates the operational flag 152 in the volatile storage 136 to "disable," meaning that no further read or write requests 142 are allowed to occur. Next, the controller 134 reads the value of the correctness flag 150 at the operation 204 and determines, at the operation 206, if the flag value is set to OK. If so (the "Yes" branch of the decision block 206), the process ends at the block 216, with the secure container disabled and the computing device 104 shut down.

If the correctness flag 150 is not set to OK (the "No" branch of the decision block 206), then the controller 134 compares the contents of the volatile storage 136 to the non-volatile storage 138. At the operation 404, the controller determines whether these contents differ. If not (the "No" branch of the decision block 404), then the controller updates the correctness flag 150 to OK at the operation 306 and then proceeds to the end block 216. If so (the "Yes" branch of the decision block 404), then the controller 134 overwrites the differing portions of the non-volatile storage 138 with data from corresponding portions of the volatile storage 136 at the operation 406. Again, the controller 134 could simply copy over the entirety of the volatile storage 136 to the non-volatile storage 138. In either instance, the controller 134 proceeds to update the value of the correctness flag 150 to OK before the process 500 ends at the block 216.

As will be apparent to one skilled in the art, the mechanisms and techniques described above may be applied in conjunction with other mechanisms and techniques that enhance the performance or reduce the write-cycle limitations of persistent memory. As a specific example, the well-known technique of wear leveling is commonly applied to reduce the effect of write-cycle limitations by relocating the physical locations of logical memory addresses so that accesses to highly used addresses are spread out over multiple physical locations. In particular, note that this technique can be applied to the location of the correctness flag 150.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims

What is claimed is:

1. A secure container configured to communicatively couple to a computing device, the secure container comprising:
   volatile storage;
   non-volatile storage including an indicator having a value that indicates whether a state of the non-volatile storage is accurate or possibly inaccurate;
   a secure interface to receive requests from components of the computing device to read and write to the volatile storage, the contents of the secure container being inaccessible to the components of the computing device other than through the secure interface; and
   a controller, configured to receive an indication that the computing device has experienced a power failure and, at least partly in response:
      copying contents of the volatile storage to the non-volatile storage, the copying comprises:
         comparing contents of the volatile storage to contents of the non-volatile storage to identify one or more portions of the non-volatile storage that do not match corresponding portions of the volatile storage; and
         overwriting the one or more portions of the non-volatile storage with the corresponding portions of the volatile storage without overwriting a remainder of the non-volatile storage; and
      after the copying of the contents, updating the value of the indicator to indicate that the state of the non-volatile storage is accurate.

2. The secure container as recited in claim 1, wherein the controller receives power to copy contents of the volatile storage to the non-volatile storage from a power source that is external to the secure container and configured to provide the power after the computing device experiences the power failure.

3. The secure container as recited in claim 1, wherein the controller is further configured to receive an indication of that the computing device has been powered-on and, in response, to:
   read the value of the indicator to determine whether the state of the non-volatile storage is accurate or possibly inaccurate;
   when the value of the indicator indicates that the state of the non-volatile storage is possibly inaccurate, refrain from processing the requests from the components of the computing device to read and write to the volatile storage; and
   when the value of the indicator indicates that the state of the non-volatile storage is accurate, copy contents of the non-volatile storage to the volatile storage and, thereafter, process the requests from the components of the computing device to read and write to the volatile storage.

4. The secure container as recited in claim 3, wherein the controller is further configured to receive the indication that the computing device has been powered-on and, in response, to:
   update the value of the indicator to indicate that the state of the non-volatile storage is possibly inaccurate from the value of the indicator indicating that the state of the non-volatile storage is accurate.

5. The secure container as recited in claim 4, wherein the controller is further configured to update the indicator to indicate that the state of the non-volatile storage is possibly inaccurate at least partly in response to receiving a first request after the computing device has been powered-on to write to the volatile storage.

6. The secure container as recited in claim 1, wherein the controller is further configured to disallow writes to the volatile storage prior to the copying of contents of the volatile storage to the non-volatile storage and at least partly in response to receiving the indication that the computing device has experienced the power failure.

7. A computing device comprising:
   one or more processors;
   memory, accessible by the one or more processors;
   an application, stored in the memory and executable on the one or more processors; and
   the secure container as recited in claim 1 to receive a read or write request from the application via the secure interface of the secure container.

8. A secure container comprising:
   volatile storage;
   non-volatile storage; and
   a controller, configured to perform acts comprising:
      determining that a computing device communicatively coupled to the secure container has been powered on; and
      at least partly in response to the determining:
         reading a flag value within the non-volatile storage of the secure container;
         determining whether the flag value indicates that a state of the non-volatile storage is accurate or whether the state of the non-volatile storage is possibly inaccurate; and
         at least partly in response to determining that the flag value indicates that the state of the non-volatile storage is accurate, copying contents of the non-volatile storage into the volatile storage, the copying comprises:
            comparing contents of the volatile storage to contents of the non-volatile storage to identify one or more portions of the non-volatile storage that do not match corresponding portions of the volatile storage; and
            overwriting the one or more portions of the non-volatile storage with the corresponding portions of the volatile storage without overwriting a remainder of the non-volatile storage.

9. The secure container as recited in claim 8, wherein the controller is further configured to perform an act comprising:
   updating the flag value to indicate that the state of the non-volatile storage is possibly inaccurate after copying contents of the non-volatile storage to the volatile storage and at least partly in response to processing a write to the volatile storage.

10. The secure container as recited in claim 8, wherein the controller is further configured to perform an act comprising:
    processing requests to read from and write to the volatile storage after copying contents of the non-volatile storage to the volatile storage and at least partly in response to the determining that the flag value indicates that the state of the non-volatile storage is accurate.

11. The secure container as recited in claim 8, wherein the controller is further configured to perform acts comprising:
updating a flag value within the volatile storage after copying contents of the non-volatile storage to the volatile storage; and
processing requests to read from and write to the volatile storage after the updating of the flag value within the volatile storage, the updated flag value within the volatile storage enabling the processing of the requests.

12. The secure container as recited in claim 8, wherein the controller is further configured to perform an act comprising:
at least partly in response to determining that the flag value indicates that the state of the non-volatile storage is possibly inaccurate, placing the secure container into a halt state.

13. The secure container as recited in claim 8, wherein the controller is further configured to perform acts comprising:
determining that the computing device has experienced a power failure; and
at least partly in response to the determining:
copying contents of the volatile storage into the non-volatile storage; and
updating the flag value within the non-volatile storage to indicate that the state of the non-volatile storage is accurate after the copying.

14. The secure container as recited in claim 13, wherein the copying of contents of the volatile storage into the non-volatile storage occurs using a power supply that is external to the secure container and that is capable of providing power, at least temporarily, after the power failure.

15. The secure container as recited in claim 8, wherein the determining that the computing device has been powered on comprises receiving an indication from a voltage sensor that is external to the secure container that the computing device has been powered on.

16. A controller implemented method comprising:
determining that a computing device communicatively coupled to a secure container has experienced a power failure; and
at least partly in response to the determining:
reading an indicator included in non-volatile storage of the secure container to determine whether a state of the non-volatile storage is correct or possibly not correct;
at least partly in response to determining that the state of the non-volatile storage is correct or possibly not correct, copying contents of a volatile storage of the secure container into the non-volatile storage of the secure container using an auxiliary power source that is external to the secure container; and
updating the indicator included in the non-volatile storage of the secure container to indicate that the state of the non-volatile storage is correct.

17. The method as recited in claim 16, comprising:
disabling writes to the volatile storage at least partly in response to the determining of the power failure and prior to the copying of contents of the volatile storage to the non-volatile storage.

18. The method as recited in claim 16, wherein the copying of contents comprises:
comparing contents of the volatile storage to contents of the non-volatile storage to identify one or more portions of the non-volatile storage that do not match corresponding portions of the volatile storage; and
overwriting the one or more portions of the non-volatile storage with the corresponding portions of the volatile storage without overwriting a remainder of the non-volatile storage.

19. The method as recited in claim 16, comprising:
determining that the computing device has been powered on after the power failure; and
at least partly in response to the determining:
reading the non-volatile storage of the secure container to determine whether the state of the non-volatile storage is correct or possibly not correct; and
at least partly in response to determining that the state of the non-volatile storage is correct, copying contents of the non-volatile storage into the volatile storage.

20. The method as recited in claim 16, wherein the controller receives power to copy contents of the volatile storage to the non-volatile storage from a power source that is external to the secure container and configured to provide the power after the computing device experiences the power failure.

21. A computing device comprising:
one or more processors;
memory, accessible by the one or more processors;
a secure container for receiving read or write requests to a volatile storage of the secure container from an application stored in the memory and executable on the one or more processors, the secure container comprising:
a controller for copying contents of the volatile storage of the secure container to a non-volatile storage of the secure container at least partly in response to receiving an indication that the computing device has experienced a power failure, the copying comprising:
comparing contents of the volatile storage to contents of the non-volatile storage to identify one or more portions of the non-volatile storage that do not match corresponding portions of the volatile storage; and
overwriting the one or more portions of the non-volatile storage with the corresponding portions of the volatile storage without overwriting a remainder of the non-volatile storage.

* * * * *